July 2, 1963 A. J. ROSS 3,095,896
FLOAT VALVE
Filed July 13, 1959

Inventor
Anthony J. Ross
By McCanna, Morsbach & Pillote
Atty's

United States Patent Office 3,095,896
Patented July 2, 1963

3,095,896
FLOAT VALVE
Anthony J. Ross, 116 Myrtle Ave., Elmhurst, Ill.
Filed July 13, 1959, Ser. No. 826,827
5 Claims. (Cl. 137—448)

This invention relates to liquid level control apparatus and particularly to an improved float control valve.

Various important objects of this invention are to provide a float valve which has a minimum of moving parts; which is of simple and economical construction, and which is reliable in operation.

A more particular object of this invention is to provide a float valve in which the valve member is mounted for tilting movement relative to the valve seat to permit liquid to flow thereby, and in which the float is rigidly connected to the valve member to move the same between a seated position when the liquid is at a preselected upper level and a tilted position when the liquid falls below the preselected level.

Another object of this invention is to provide an improved arrangement for guiding the valve member and float between the opened and closed positions of the valve, to prevent spurious unseating of the valve member due to sideways movement of the float.

These, together with various ancillary objects and advantages of this invention will be more readily appreciated as the same becomes better understood from reference to the following detailed description when taken in connection with the accompanying drawings wherein.

Figure 1:
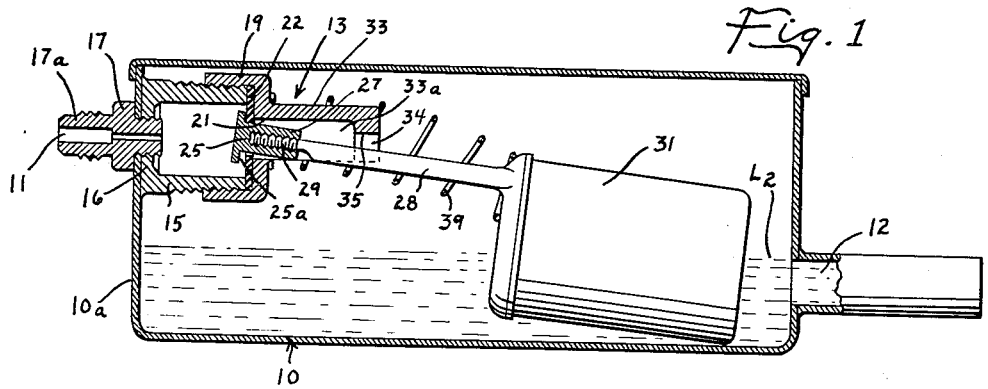
FIGURE 1 is a vertical sectional view through the float valve, showing the parts in the open position of the valve.

The liquid level control apparatus of the present invention includes a tank 10 having a liquid inlet 11 and an outlet 12. A float controlled valve 13 is disposed within the tank 10 and mounted on one end wall 10a to control the flow of liquid into the tank and maintain a preselected liquid level therein. The float valve body comprises an externally threaded nipple 15 having a wall 16 on one end thereof which abuts against the end wall 10a of the tank. A fitting 17 is threaded into an opening in the wall 16 on the nipple and overlies the outer face of the end wall of the tank to retain the valve body in position on the tank. The fitting is provided with an externally threaded portion 17a which is adapted for connection to a liquid inlet line and the liquid inlet passage 11 is formed in the fitting 17 and extends therethrough. A cap 19 is threadedly mounted on the nipple and has a central opening 21 defining a liquid outlet port. A resilient gasket 22 is interposed between the end of the nipple and the cap 19 to seal the interface therebetween, and overlies the inner face of the cap around the port 21 to define a valve seat.

The valve seat is disposed in a generally vertical plane and a valve member 25 having a valve face 25a is adapted in one position to lie flush against the valve seat and block flow through the outlet port 21. When the valve member is tilted away from the aforementioned position, the valve face unseats and allows liquid to flow through the outlet port. The valve member 25 is rigidly connected to the float for movement as a unit therewith and is advantageously detachable therefrom. For this purpose, the valve member is formed with an internally threaded shank portion 27 and the float valve stem 28 has an externally threaded end portion 29 which is threadedly received in the shank of the valve member. The float 31, herein shown in the form of a hollow metal cylinder, is rigidly attached as by brazing or soldering to the outer end of the float valve stem 28 so that the float, the stem and valve member move as a unit.

Figure 2:
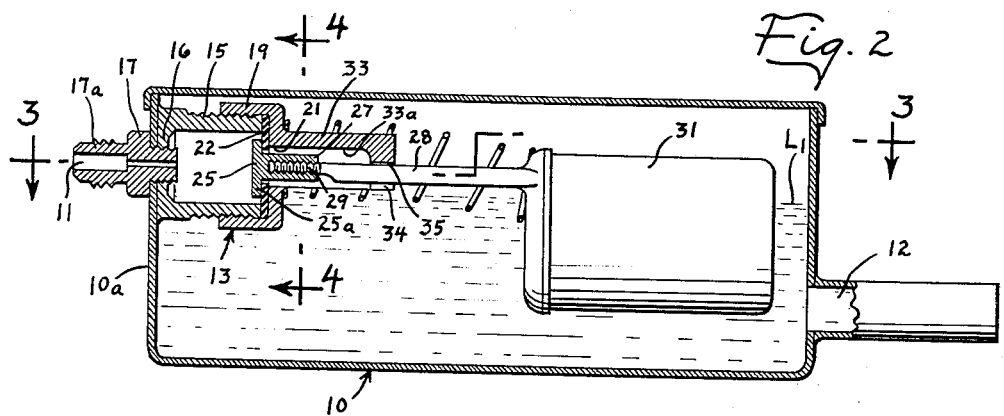
FIG. 2 is a vertical sectional view through the float valve showing the valve in its closed position.
Figure 3:
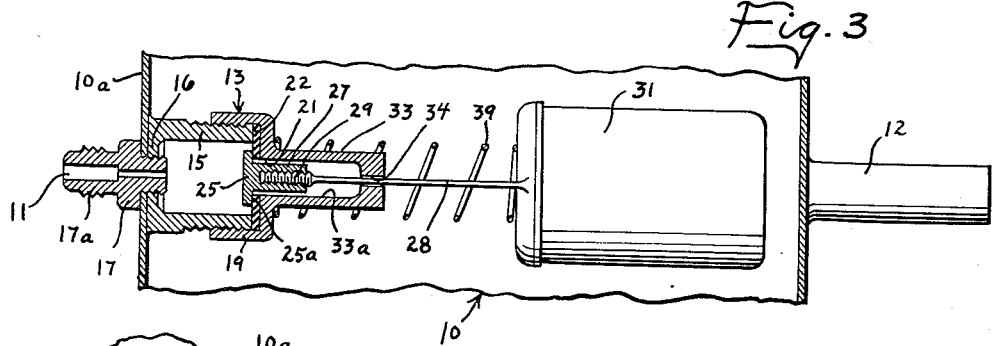
FIG. 3 is a fragmentary horizontal sectional view taken on the plane 3—3 of FIG. 2.
Figure 4:
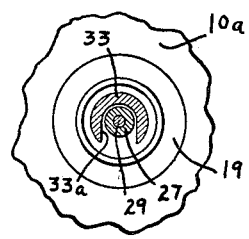
FIG. 4 is a fragmentary vertical sectional view taken on the plane 4—4 of FIG. 2.

A guide sleeve 33 is rigidly attached to the cap 19 and extends outwardly around the discharge port 21 to guide the stem and float. As shown, the guide sleeve has an enlarged concavity 33a spaced inwardly from its outer end and which concavity opens at the underside of the sleeve to loosely receive the shank 27 of the valve member and permit free tilting movement of the latter between the generally horizontal position shown in FIG. 2 and a tilted position as shown in FIG. 1. The sleeve is formed with spaced guide fingers 34 at its outer end which guidably receive the float valve stem 28 therebetween and prevent sidewise movement of the stem and float. In this manner, lateral tilting of the valve member 25 is prevented. Preferably, the stem 28 is formed with the flat oblong cross-section so that the guide fingers also prevent turning of the stem and float. The sleeve is also advantageously formed with an upper stop 35 which is arranged to engage the upper edge of the stem to prevent elevating of the float above the normal seated position of the valve.

As will be noted, the fluid pressure on the line acts on the inner face of the valve member 25 to aid in pressing the same to its seated position to maintain a seal between the valve member and its seat. In order to assure reliable operation, even under low line pressure, a spring 39 is provided. The spring is of the coil type and as herein shown surrounds the sleeve 33 and stem 28 and abuts at one end against the cap 19 and at the other end against the float 31 to urge the float and the attached valve member in a direction to increase the seating pressure. In order to prevent siphoning of water from the tank 10 through the valve and back into the inlet 11, in the event of a loss in line pressure, the float valve is arranged so as to normally maintain the upper liquid level designated $L_1$ below the outlet port 21. This is achieved by attaching the stem 28 to the float 31 at a point adjacent the upper side of the float.

From the foregoing it is thought that the operation and construction will be readily understood. The float and valve member are assembled on the cap 33 by threading the stem 28 into the shank of the valve member, and the valve assembly is then mounted on the nipple 19 by threading thereon. As will be noted, the gasket 22 performs the dual function of sealing the cap to the nipple and also of providing a seat for the valve member. Since the valve member and float are rigidly interconnected, there are no bearings or pivots which can bind and impair proper operation of the float valve.

The guide fingers 34 prevent unseating of the valve member, due to lateral or side-wise movement of the float, and the stop 35 prevents the float from rising above a position in which the valve is seated to prevent unseating of the valve in the event the liquid, for any reason, rises above the level $L_1$. When the valve member 25 is seated, the line pressure acts on its inner face and presses the valve member firmly against the seat. The spring 39 augments the line pressure to aid in maintaining proper seating pressure, even when the line pressure is low.

I claim:

1. A liquid level control valve comprising a valve body defining a chamber having a liquid inlet passage and an outlet passage, said body having a substantially vertically disposed seat on the inner side of the body around said outlet passage, a valve member loosely positioned in said chamber adapted to overlie said outlet passage and having a face cooperable with said seat to block flow through said outlet passage in one position of the valve member and to open and permit flow when the valve member is tilted relative to said seat away from said one position, a stem rigidly attached to said valve member and extending generally horizontally outwardly of said chamber through said outlet passage, a float rigidly attached to the outer end of said stem to normally gravitationally urge the stem downwardly and tilt the valve member relative to its seat away from said one position, said float being adapted to be buoyed upwardly as the water level rises to move the stem upwardly until the valve member reaches said one position and stops the flow of liquid through said outlet passage, said body including a rigid guide member extending outwardly of the body alongside said stem, said guide member having a stop portion overlying said stem and engageable with the stem to prevent swinging of the stem above a position in which the valve member lies substantially flush with the valve seat, said guide member having vertically extending guide portions positioned along opposite sides of the path of travel of said stem and guidably engaging opposite sides of the stem to prevent horizontal swinging of the stem and float, and an elongated longitudinally resilient and laterally flexible spring disposed externally of said chamber and having one end engaging said body and the other end operatively connected to said outer end of said stem to urge the stem in a direction generally axially thereof and thereby yieldably urge the valve member toward its seat.

2. The combination of claim 1 wherein said stem has a non-circular cross-section non-rotatably disposed between said guide portions on said sleeve.

3. A liquid level control valve comprising a valve body defining a chamber having a liquid inlet passage and an outlet passage, said body having a substantially vertically disposed seat on the inner side of the body around said outlet passage, a valve member loosely positioned in said chamber adapted to overlie said outlet passage and having a face cooperable with said seat to block flow through said outlet passage in one position of the valve member and to open and permit flow when the valve member is tilted relative to said seat away from said one position, a stem rigidly attached to said valve member and extending generally horizontally outwardly of said chamber through said outlet passage, a float rigidly attached to the outer end of said stem to normally gravitationally urge the stem downwardly and tilt the valve member relative to its seat away from said one position, said float being adapted to be buoyed upwardly as the water level rises to move the stem upwardly until the valve member reaches said one position and stops the flow of liquid through said outlet passage, and a rigid guide member attached to said body and extending outwardly of the body alongside said stem, said guide member having a stop portion overlying said stem and engageable with the stem to prevent swinging of the stem above a position in which the valve member lies substantially flush with the valve seat, said guide member having vertically extending guide portions positioned along opposite sides of the path of travel of said stem and engageable with opposite sides of the stem to prevent horizontal swinging of the stem and float, and a coil spring surrounding said guide member and loosely surrounding said stem and engaging said body and said float to yieldably urge said valve member toward said seat.

4. A liquid level control valve comprising a valve body defining a chamber having an inlet passage, a cap detachably mounted on said body and having an outlet passage and a substantially vertically disposed valve seat around said outlet passage, a valve member loosely positioned in said chamber adapted to overlie said outlet passage and having a face coperable with said seat to block flow through said outlet passage in one position of the valve member and to open and permit flow when said valve member is tilted relative to said seat away from said one position, a stem detachably but rigidly secured to said valve member for movement as a unit therewith and extending generally horizontally outwardly of said chamber through said outlet passage, a float rigidly attached to the outer end of said stem to normally gravitationally urge the stem downwardly and tilt the valve member relative to its seat away from said one position, said float being adapted to be buoyed upwardly as the water level rises to move the stem upwardly until said valve member reaches said one position and stops the flow of liquid through said outlet passage, a rigid guide member on said cap extending outwardly therefrom, said guide member having stop means overlying said stem for limiting movement of the stem above a position in which the valve member lies substantially flush with the valve seat and spaced guide portions slidably engaging opposite sides of the valve stem for preventing horizontal swinging movement of the stem and float, and a coil spring disposed around said guide member and engaging said cap and said float for yieldably urging said valve member to its seated position.

5. The combination of claim 4 wherein said stem extends eccentrically to said float from a point adjacent the top of the float, and said stem has a non-circular cross-section non-rotatably disposed between said guide portions to prevent turning of the stem and float relative to the cap.

References Cited in the file of this patent

UNITED STATES PATENTS

| Re. 18,243 | Estep | Nov. 3, 1931 |
| 435,066 | Krehbiel | Aug. 26, 1890 |
| 562,543 | Kubach | June 23, 1896 |
| 2,502,335 | Metzger | Mar. 28, 1950 |
| 2,684,077 | Shaffer | July 20, 1954 |
| 2,873,942 | Drane | Feb. 17, 1959 |

FOREIGN PATENTS

| 562 | Great Britain | 1878 |
| 20,586 | Australia | Jan. 15, 1936 |
| 111,117 | Australia | July 23, 1940 |
| 74,775 | Denmark | Sept. 15, 1952 |